Figure 1:
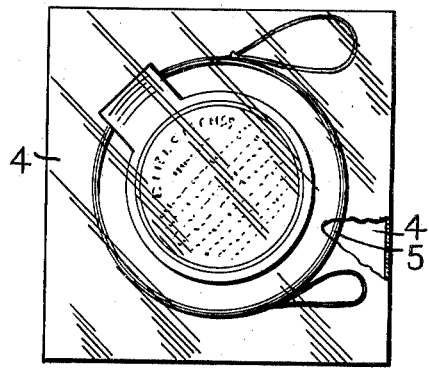

April 8, 1941.  W. H. CAROTHERS  2,237,412
FISHING TACKLE
Filed April 9, 1940

Inventor
Wallace Hume Carothers, Deceased
By Wilmington Trust Company, Executor
By Harold A. Jewett
Attorney Patented Apr. 8, 1941

2,237,412

UNITED STATES PATENT OFFICE 2,237,412

FISHING TACKLE

Wallace Hume Carothers, deceased, late of Wilmington, Del., by Wilmington Trust Company, executor, Wilmington, Del., assignor to E. I. du Pont de Nemours and Company, Wilmington, Del., a corporation of Delaware Application April 9, 1940, Serial No. 328,792

4 Claims. (Cl. 43—31)

This application is a continuation-in-part of application Serial Numbers 125,887, filed February 15, 1937, now U. S. P. 2,137,235; 136,031, now U. S. P. 2,130,948, filed April 9, 1937; and 230,726, filed September 19, 1938.

This invention relates to fishing tackle, and more particularly to the fishing line elements thereof.

The leader, snell, tippet, dropper or other lure-carrying terminal members of the line (hereinafter comprised, along with the line proper, in the generic designation, "terminal line element"), heretofore have been fabricated from various materials. Those produced from artificial textile products, such as viscose, cellulose acetate, or other cellulose derivatives, possess very low wet strength, however, when used in sizes sufficiently small for low visibility, and their weakness has not proved remediable by the application of coating materials. Moreover, they lose their strength rapidly if repeatedly wet and dried.

Metallic leaders and snells have been used for a relatively very restricted type of fishing, namely, fishing in salt water where fish having very sharp teeth are apt to bite the leader in two, but otherwise have not found extensive use.

Multifil leaders of silk fibers which have been cemented together also have been employed to some extent, but these products have low strength when wet and very low resistance to abrasion.

By reason of the various deficiencies of the aforesaid prior art leader materials, the great majority of leaders heretofore have been fabricated from the "gut" of the Spanish silkworm, the said gut being imported from a small territory surrounding Murcia, Spain.

The vulnerability of natural silk fibers to the rotting or mildewing effects of continued or repeated exposure to wet or damp conditions, is shared by gut leaders and snells; so much so that it is widely customary for fishermen to discard them at the end of each season. It is a matter of great significance, in this connection, that fraying and splitting characteristically develop first at the tips of the loops, or in the knots, in the gut leaders and snells. Also, it is precisely at these points that the gut ordinarily is subjected to the most acute bending or coiling.

During periods of non-use, when the dry leader as a whole is maintained in a coiled state, it tends gradually to develop a condition of "molecular fatigue," by reason of stresses or tension set up in the filament, incident to its being left in a permanently flexed condition while dry. Consequently, it is usual to store or merchandise the gut leaders in coils of not less than about three and one-half inches diameter, and practically never in coils of less than two and one-half inches in diameter. The incidence of the said fatigue appears to be intimately associated with the fact that the gut is very brittle and non-flexible while in the dry state. In fact, if a portion of the leader is tied (while wet and pliable) into a tight knot—as when tied through the eye of a fly—it is almost invariably customary to sever the knotted part after use, since subsequent dryness, together with lapse of time, would render the leader too unreliable, in respect of its strength at the point of the said knotting.

The inherent brittleness and non-flexibility of the dry gut constitutes a tremendous handicap since soaking in water for about an hour, or, better, for two hours, in preparation for use, is requisite for imparting adequate flexibility and strength. Without such pre-soaking the gut leader will not uncoil and remain uncoiled, on being fly-cast, nor will it withstand the jerk of a hooked fish, without being liable to break in two. Such breaking in two is similar to the frequent snapping off of a snelled hook, on the back-cast, when the knot holding the hook to the gut snell has not been sufficiently pre-soaked.

It thus appears that whereas the pre-soaking of the gut is necessary in order to overcome brittleness, whether or not the gut is initially in the straight or the coiled state, the said necessity will be aggravated if the gut is coiled.

Despite these great difficulties and the resultant universal need for resort to the annoying use of leader boxes containing wet felt soaking pads (which will lead to the rotting of the leaders if the angler inadvertently fails to remove them after his fishing is over), all efforts of the trade have been unsuccessful, heretofore, in searching for an avenue of escape from the said difficulties. Nevertheless, the outstanding space-saving efficiency to be enjoyed by merchandising, transporting, and storing the leaders in a coiled or flexed and dry state, has led merchants and anglers universally to keep them in such state, while not in use, and to put up with the concomitant necessity for the said prolonged pre-soaking.

On this score, it is to be observed that in the ordinary course of fishing, leaders are apt to be destroyed by any of a number of various kinds of mishaps, such as extraordinarily powerful jerks by fish, bites by fish with sharp teeth (as in ocean water), or cutting on sharp corners. Consequently, it is very desirable to have a reserve supply of leaders on hand at all times, and ready for use. To do so, however, requires that they be kept constantly in a soaked condition, as hereinabove explained, even though excessive soaking ruins them. The angler, therefore, is faced with the dilemma of using up an excess number of leaders by merely soaking them, or of taking an hour's recess from his fishing in order to soak another leader, every time the one he is using accidentally is destroyed.

In view of the foregoing deficiencies in the line elements of the prior art, this invention has as an object the provision of new line elements, more particularly leaders, which not only provide the best solution known to the art, of the short-comings hereinabove set forth in the said prior art elements, but which also provide or make possible unprecedented physical and chemical attributes including, particularly, flexibility even while dry; ability to straighten out on being flycast, without having been pre-soaked; great resistance to abrasion, kinking, continued or intermittent soaking in water, mildew, mold and microscopic or other parasitic pests; good balance between weight and strength, together with outstanding properties of stretchability and recovery from stretch, especially in response to sudden jerks; transparency; ability to withstand sharp and permanent flexing or state of flex, and tight coiling while dry; and ability to withstand satisfactorily the effects of ordinary use and conditions of use, and aging, for a plurality of seasons.

The invention also has as an object the provision of fly-casting tackle wherein the hook, lure, leader and line are assembled together by knotting while dry, stored or transported in a compactly folded or coiled space-economizing ensemble, whether on the reel or otherwise disposed in a compact state or packaged form, and successfully fly-cast without pre-soaking, directly upon arrival at the fishing grounds.

The invention consists in the discovery that the foregoing objects can be accomplished—and the said coiled ensemble—particularly the coiled leader or other terminal line elements—produced, by fabricating the leader from synthetic linear polyamide, in the manner hereinafter described, and coiling the leader while dry, and without any need for soaking—either in preparation for or in consequence of such coiling—into the aforesaid state, or also incorporating the coiled leader into the aforesaid ensemble at any stage in the life of the tackle, as, for example, in preparation for the merchandizing thereof.

Further features of the invention will appear hereinafter.

In the accompanying drawing Fig. 1 shows a flat, transparent package 4, formed of regenerated cellulose, e. g., and containing a dry polyamide monofil leader 5 held coiled in the conventional manner, as by tying, or by the confining force of the walls of the package, but coiled to a diameter substantially less than is conventional in the case of the prior art gut leaders—that is to an average which may be less than about two and one-half inches, and even as low as one inch, or lower, if desired. Also contained in the package 4 and associated with the leader 5 there may be printed matter setting forth directions for use, as for example instructing the user that the polyamide leader may be knotted direct to the eye of hook while dry, fly-cast and otherwise used without soaking, alternately soaked and dried without injury, and subjected to continuous use without danger of the leader's fraying, splitting, or becoming sleezy.

Figure 2:
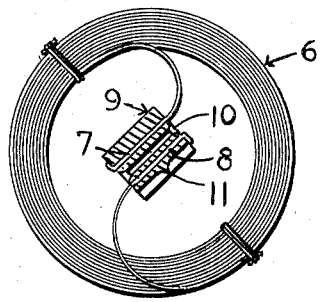

Fig. 2 shows an unpackaged relatively tightly coiled monofil 6, of a length equivalent to that of a plurality of leaders, the monofil 6 having its ends secured through apertures 7 and 8 in a rigid member 9, the same containing a straight cylindrical bore 10, suitably about one-half inch in length, and the said bore having a diameter equal to, or slightly greater than, that of the leader. After the angler has cut from the said coil a length of leader appropriate for his immediate purposes, he conveniently may, if he wishes, straighten the same prior to casting, by merely pulling the said length through the said bore. Optionally, the member 9 may be provided with a cutting edge 11, adapted for use in severing leader lengths from the coil. Member 9 may, if desired, be formed of molded polyamide, either dyed or undyed, or formed in the shape of a conventional spinner, so as to be available for use as such during the actual fishing, as well as for pre-straightening the coiled leader prior thereto, in conjunction with the purpose of holding the ends of the leader coil secure, during transportation or storage.

The use of such a straightening means as is illustrated in Fig. 2, although unnecessary in the usual case, may become desirable on occasion, as e. g., by reason of the fly-casting inexpertness of the individual angler, unusually thick cross-section of the leader, or closely compact, and, if desired, completely compact folding of the leader monofil upon itself, in transportation, whereby the angles of flex to be straightened out may approach, or be, approximately, 180°. The economy of space incident to compact coiling, together with the ready availability of cutting and straightening means, becomes highly important in those situations where the clumsiness and size of the prior art leader boxes is especially annoying, as when the angler is wading at a considerable distance from shore, or in kinds of fishing where the leaders are frequently snapped in two. In salt water angling, for instance, where sharp-toothed fish usually abound, and resort to metal leaders heretofore has been regarded as consequently inescapable, the advent of a cheap but superior leader, capable of being replaced by merely cutting off a portion of a compactly folded, dry coil of monofil of unlimited length, long has been awaited by the consuming public. Replacements of severed leaders thus becomes convenient and non-expensive, since the awkward soaking boxes used for the expensive prior art gut leaders become superfluities when the leaders of the invention are employed.

Figure 3:
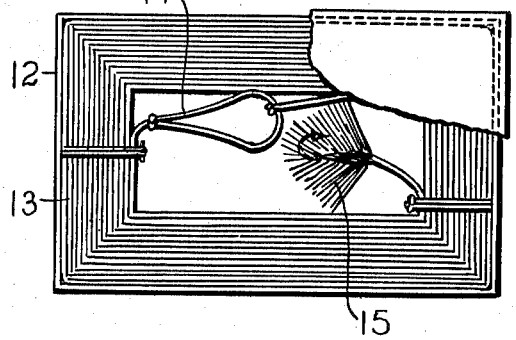

Fig. 3 shows a rectangular box 12 containing a line 13 with dry leader 14 and eyed fly 15 joined thereto, ready for use; the said ensemble being arranged in parallel relatively flat folds, having angles of approximately 90°. Packaging in such manner effects important economy in space on the merchants' shelves, in addition to being of great convenience to the purchaser. For instance, the entire line structure and lure, with no pre-treatment of any sort, is all ready for reeling and casting, and requires no leader boxes, wet felt pads, or other such adjuncts as are indispensable to the fly-casting angler who uses line elements of the prior art.

The polyamides used in the practice of the invention contain amide groups as an integral part of the main chain of atoms in the polymer and may be prepared from bifunctional polyamide-forming reactants. It is not essential that the linking group in the polymer chain consist solely of amide groups; they also may contain other groups, e. g., ester groups.

The polyamides used in this invention are of two general types, those derived from diamines and suitable dicarboxylic acids or amide-forming derivatives of dibasic carboxylic acid, and those derived from polymerizable monoaminomonocarboxylic acids or amide-forming derivatives thereof, e. g. ester and lactams. On hydrolysis with hydrochloric acid the polyamides yield polyamide-forming reactants; polyamides of the diamine-dibasic acid type yield a diamine hydrochloride and a dibasic carboxylic acid, whereas those of the amino acid type yield an amino acid hydrochloride. As specific examples of such polyamides may be mentioned polydecamethylene adipamide, polyhexamethylene sebacamide, polypentamethylene sebacamide, polyoctamethylene adipamide, 6-aminocaproic acid polymer, and 11-amino-undecanoic acid polymer. Mixtures of polyamides and interpolyamides may also be used. Examples of such interpolyamides are those derived from hexamethylenediamine, decamethylenediamine, adipic acid and sebacic acid, and from hexamethylenediamine, adipic acid, and 6-aminocaproic acid.

As stated in the hereinabove-cited parent patent, Carothers U. S. P. 2,130,948, and illustrated in the examples set forth hereinafter, the polymerization reaction should be continued at least until the intrinsic viscosity of the polyamide, as defined at the foot of column 2 on page 2 of the said parent patent, is at least 0.4.

The filaments or fibers employed in the practice of the invention need not necessarily consist wholly of polyamides or modified polyamides. Frequently it is desirable to deluster or color the filaments or fibers by adding a pigment to the polymer or to the reactants from which the polymer is prepared. Sometimes it also is useful to dye the filaments or fibers, for instance with calico black, sudan brown, or coloring materials closely resembling the color of the water, or its turbidity, by appropriate choice of dyes or pigments.

When increased flexibility is desired, the polyamide may be modified with a plasticizer, for example, phenols or aryl sulfonamides. These may be added to the preformed line elements merely by immersing the same in a solution of the said plasticizer in a non-solvent for the polyamide.

Fillers, resins, antioxidants, and the like, also may be employed. The use of surface modifying agents or water repellents ordinarily is wholly unnecessary.

The leaders may consist of monofils or multifils, but generally are less visible, as well as otherwise superior, if they consist of monofils. The monofil strands may be knotted together, if desired, but ordinarily knotless leaders are preferred. Generally, the most advantageous diameter for the monofil leader will lie between 0.003 and 0.06 inch, depending on the type of gear to be employed.

The following examples will illustrate the preparation of polyamide leaders.

Example I

For the preparation of leaders and snells molten polyhexamethylene adipamide, having a melt viscosity of 450 poises at 285° C. and an intrinsic viscosity of 0.88, was extruded at a constant rate of 200 feet per minute through a spinneret having an orifice size of about 0.040 inch into water, the surface of which was one inch below the spinneret orifice. The extruded filament was pulled through the water by means of pinch rolls rotating at a constant speed to give a filament 0.020 inch in diameter. The filament was then soaked in water 16 hours, cold drawn to approximately four times its original length, conditioned in a substantially straight position by winding it under tension on a reel, immersing the reel containing the filament in boiling water for two hours, and then drying. The straight length of the polyamide filament thus obtained had a diameter of about 0.010 inch and a tensile strength (dry) of about 4.0 pounds. The filament was tough and pliable and had high resistance to kinking. It was very useful as fishing leaders and snells, and could be maintained compactly coiled when not in use, without ill effect.

Short lengths of 12, 9 and 7 mil filaments, cut from filament prepared in accordance with the above procedure and tied together to give a gradation in size, made a very satisfactory conventional type of tapered leader. Filaments dyed with National Fast Acid blue dye in the presence of formic acid had a bluish appearance which, is desirable for certain types of leaders.

The tensile strengths of filaments of various sizes useful as leaders or other terminal line elements, prepared by the method described above, were determined by standard procedures with the results given in Table I. The wet strengths are the values of greatest significance in fishing.

TABLE I

*Tensile strength of polyamide leaders*

| Diameter in mils | Pounds to break | |
|---|---|---|
| | Wet | Dry |
| 5 | 1.15 | 1.47 |
| 7 | 1.78 | 1.90 |
| 10 | 3.25 | 4.09 |
| 11 | 3.81 | 5.03 |
| 15 | 9.06 | 12.00 |
| 20 | 14.80 | 18.80 |

Example II

For the preparation of a uniformly tapered leader, molten polyhexamethylene adipamide, having a melt viscosity of 450 poises at 285° C. and an intrinsic viscosity of 0.88, was fed at a constant rate through an orifice 0.040 inch in diameter. The filament formed was led through a quenching bath, the surface of which was one inch below the orifice, to an irregularly shaped take-off roll. The take-off roll was so designed that when rotating at a constant speed the peripheral speed of the roll varied in the ratio of 1 to about 3.2 during the course of a single revolution. The perimeter of the roll was 64 inches, so that a regular variation in the diameter of the filament was obtained at 32 inch intervals. Table II shows how the distance from the periphery of the take-off roll to its axis varies at four inch intervals along the periphery. It also shows how the diameter of the resultant filament varies for the corresponding four inch intervals. After water soaking for 16 hours, the filament was cold drawn through rolls three inches between centers to four times its original length, and cut at the thin and thick sections to give tapered fishing leaders 10.7 feet long, in which the diameter of the thick end was about twice that of the thin end. These tapered leaders were especially useful for fishing in still, clear water, because of the absence of knots. The kink resistance of the leaders was improved by holding them in a straight position under tension in boiling water for two hours. The leaders were packaged in flat, rectangular style, such as illustrated in Fig. 3, without any ill effect from such packaging.

TABLE II

*Take-off roll for preparing tapered leaders*

| Diameter of filament at 4 inch intervals | Distance from periphery of roll to the axis |
|---|---|
| *Relative diameter* | *Inches* |
| 18.00 | 19.00 |
| 19.75 | 15.80 |
| 21.50 | 13.32 |
| 23.25 | 11.40 |
| 25.00 | 9.83 |
| 26.75 | 8.58 |
| 28.50 | 7.57 |
| 30.25 | 6.73 |
| 32.00 | 6.02 |

In the case of the polyamides, soaking the filaments in water before cold drawing, or in another hydroxylated non-solvent for the polyamide, such as ethyl or other alcohols, or rapidly chilling the hot filament as it is formed during the spinning, as by quenching in water or other non-solvent for the polyamide, decreases the force required for cold drawing, and makes possible the production of larger and stronger oriented filaments than otherwise would be possible. The rapid chilling is particularly desirable in the production of fishing line elements, because of the increased toughness imparted to the filaments. It also is a means for improving the transparency of the product, by virtue of rendering the average diameter of the crystal aggregates less than approximately two microns. Further treatment after cold drawing, which consists in soaking the oriented filaments in water or subjecting them to steam or other setting agent, results in filaments of markedly increased elastic recovery, and retention of this quality upon aging. All of these properties are highly desirable in fishing line elements.

Among the more important points of superiority of the line elements of the invention over those of the prior art, are their remarkable aging characteristics. Apparently no harm is done by allowing them to remain wet or damp for long periods of time, whereas the prior art line elements soon deteriorate to a marked degree, or go to pieces entirely, when so treated.

In addition, they exhibit no signs of the molecular fatigue to which the coiled gut leaders appear to be subject, as a result of being maintained in the coiled state, while dry, for extended periods of time. In this connection it is particularly surprising that the leaders of the invention not only function satisfactorily in the water, without having been pre-soaked, but also uncoil readily upon being fly-cast while dry; since the synthetic polyamides are known to be especially insensitive to water, and since the leaders made from silkworm gut, which is a natural polyamide, do not function at all satisfactorily in these respects unless pre-soaked.

A further point of unexpected superiority of the line elements of the invention over the silk and silkworm gut, of the prior art, is the almost unlimited life, and season to season durability, of the former. The intermittent wetting and drying incident to average conditions of use does not impair the quality of the line elements of the invention to any degree comparable to the extent of deterioration which the prior art silk and gut products undergo. The comparison is especially striking in the case of salt water angling.

The extraordinary tensile rubberiness of the leaders of the invention, especially those of six to eighteen or more feet in length, makes possible the use of a considerably lighter rod, ounce (of rod) for ounce or pound (of fish). That is, since the angler's technique in playing a hooked fish involves maintaining the rod at an angle approaching 90° with the taut line, the unprecedented tensile give and recovery properties of the polyamide leaders serve to cushion the bending stress imposed upon the tip of the rod by the sudden and violent jerks of the fish. This cushioning effect may be supplemented to particular advantage by employing a line composed of one or more polyamide fibers or filaments, as for example a braided line composed of polyamide fibers. In such case the requisite balance between stiffness and flexibility of the line proper for the particular tackle to be used may be achieved by the use of a conventional coating of enamel or varnish, or by selecting the appropriate filament diameter for the particular tackle, from the filament diameter ranges stated hereinabove, or by both methods.

The abrasion-, fraying-, crack-, and heat-resistance of the polyamide filaments of the invention also is outstandingly superior to that of the prior art materials. The readily controllable degree of transparency, translucency, or coloration similarity to that of the particular water in which the fishing is to be carried on, is of great importance in all kinds of fishing, particularly as regards the line elements nearest the hook, as, for example, the leaders, snells, tippets, droppers, or the like.

The heat and abrasion resistance of the polyamide line elements is of outstanding importance not only in fly-casting, but also, and to an even greater degree, in those types of angling wherein the particular fish are far larger and far more powerful than trout. For example, in certain kinds of salt water fishing where fish weighing upwards of fifty or one hundred pounds each are hooked and fought with for an hour or two, before being landed, the line elements in the meantime running at a high rate of speed back and forth through the guides as the fish is played, high degrees of abrasive wear and of heating are brought to bear on the line elements. Of course, the same kinds of wear continually are brought to bear on the line elements in freshwater fly-casting as well, since in that type of fishing the line also is continually running back and forth through the guides, but the test is not so severe, from the standpoint of the stresses brought to bear on the tackle, the heat generated, or the duration of the struggle.

As many apparently widely different embodiments of this invention may be made without departing from the spirit and scope thereof, it is to be understood that the invention is not limited to the specific embodiments thereof except as defined in the appended claims.

It is claimed:

1. A fishing leader and means for maintaining said leader in a coiled condition, said leader having a cross-section throughout its length of a diameter within the range .003 to .06 inch, being in coiled form of not less than one inch average coil diameter, and consisting essentially of synthetic linear polyamide; said leader being adapted after removal of said means to uncoil on being fly-cast, and remain in an uncoiled condition upon completion of the fly-casting operation, without prior soaking treatment.

2. A fishing leader and means for maintaining said leader in a coiled condition, said leader having a cross-section throughout its length of a diameter within the range .003 to .06 inch, being in coiled form of not less than one inch average coil diameter, and consisting essentially of synthetic linear polyamide obtained from a polymerizable monoaminomonocarboxylic acid; said leader being adapted after removal of said means to uncoil on being fly-cast, and remain in an uncoiled condition upon completion of the fly-casting operation, without prior soaking treatment.

3. A fishing leader and means for maintaining said leader in a coiled condition, said leader having a cross-section throughout its length of a diameter within the range .003 to .06 inch, being in coiled form of not less than one inch average coil diameter, and consisting essentially of synthetic linear polyamide obtained from a mixture of diamine and dibasic carboxylic acid; said leader being adapted after removal of said means to uncoil on being fly-cast, and remain in an uncoiled condition upon completion of the fly-casting operation, without prior soaking treatment.

4. A fishing leader and means for maintaining said leader in a coiled condition, said leader having a cross-section throughout its length of a diameter within the range .003 to .06 inch, being in coiled form of not less than one inch average coil diameter, and consisting essentially of polyhexamethylene adipamide; said leader being adapted after removal of said means to uncoil on being fly-cast, and remain in an uncoiled condition upon completion of the fly-casting operation, without prior soaking treatment.

WILMINGTON TRUST COMPANY,
*Executor of the Estate of Wallace Hume Carothers, Deceased,*
By ELWYN EVANS,
*Vice President.*